(12) United States Patent
Jain et al.

(10) Patent No.: US 10,218,780 B2
(45) Date of Patent: Feb. 26, 2019

(54) CLOUD BASED PEER ASSISTED UPDATES IN A DEVICE MANAGEMENT ENVIRONMENT

(71) Applicant: Wyse Technology L.L.C., Santa Clara, CA (US)

(72) Inventors: Shailesh Jain, Bangalore (IN); Prashanth Devendrappa, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 387 days.

(21) Appl. No.: 15/133,712

(22) Filed: Apr. 20, 2016

(65) Prior Publication Data
US 2017/0310742 A1    Oct. 26, 2017

(51) Int. Cl.
| | | |
|---|---|---|
| G06F 15/16 | (2006.01) | |
| H04L 29/08 | (2006.01) | |
| H04W 4/08 | (2009.01) | |
| H04W 4/50 | (2018.01) | |

(52) U.S. Cl.
CPC ........ *H04L 67/101* (2013.01); *H04L 67/1042* (2013.01); *H04L 67/1051* (2013.01); *H04L 67/1097* (2013.01); *H04L 67/2857* (2013.01); *H04L 67/34* (2013.01); *H04W 4/08* (2013.01); *H04W 4/50* (2018.02)

(58) Field of Classification Search
CPC ............... H04L 67/101; H04L 67/1042; H04L 67/1051; H04L 67/1097; H04L 67/34
See application file for complete search history.

(56) References Cited

U.S. PATENT DOCUMENTS

| | | | | |
|---|---|---|---|---|
| 6,857,012 B2 * | 2/2005 | Sim | .................... | G06F 17/30194 709/222 |
| 6,970,939 B2 * | 11/2005 | Sim | .................... | G06F 17/30194 709/236 |
| 7,047,287 B2 * | 5/2006 | Sim | .................... | G06F 17/30194 709/221 |
| 7,058,014 B2 * | 6/2006 | Sim | .................... | G06F 17/30194 370/230 |
| 7,165,095 B2 * | 1/2007 | Sim | .................... | G06F 17/30194 709/217 |
| 7,177,270 B2 * | 2/2007 | Sim | .................... | G06F 17/30194 370/229 |

(Continued)

*Primary Examiner* — Moustafa M Meky
(74) *Attorney, Agent, or Firm* — Kirton McConkie; Brian Tucker

(57) ABSTRACT

Peer assisted updates can be provided in a device management environment. When it is desired to deploy an update to a group of managed devices, an update command can be sent to a first set of managed devices in the group instructing these managed devices to download the update. Once these managed devices have downloaded and installed the update, they will notify the management server. In response, the management server can instruct these managed devices to remain awake so that they may each function as a master device or repository for deploying the update to other managed devices in the group. The management server can then send update commands to the other managed devices instructing them to download the update from one of the managed devices that is now acting as a master device. This process can be repeated until all managed devices in the group have been updated.

20 Claims, 7 Drawing Sheets

(56) References Cited

U.S. PATENT DOCUMENTS

| | | | | |
|---|---|---|---|---|
| 7,181,523 B2* | 2/2007 | Sim | G06F 17/30194 | 709/226 |
| 7,490,164 B2* | 2/2009 | Srivastava | H04L 45/50 | 370/235 |
| 8,082,348 B1* | 12/2011 | Averbuj | H04L 45/306 | 709/203 |
| 9,021,460 B2* | 4/2015 | Yoshida | G06F 8/65 | 717/168 |
| 9,294,558 B1* | 3/2016 | Vincent | H04L 67/1006 | |
| 9,619,243 B2* | 4/2017 | Balakrishnan | G06F 13/364 | |
| 2014/0266669 A1* | 9/2014 | Fadell | G05B 19/042 | 340/501 |
| 2015/0061859 A1* | 3/2015 | Matsuoka | G08B 27/00 | 340/501 |
| 2015/0100167 A1* | 4/2015 | Sloo | F24F 11/30 | 700/278 |
| 2015/0109104 A1* | 4/2015 | Fadell | G08B 27/003 | 340/5.65 |
| 2015/0109112 A1* | 4/2015 | Fadell | G08B 27/003 | 340/328 |
| 2015/0154850 A1* | 6/2015 | Fadell | G06Q 10/083 | 340/501 |
| 2015/0156030 A1* | 6/2015 | Fadell | H04L 12/2816 | 700/90 |
| 2015/0156031 A1* | 6/2015 | Fadell | H04L 12/2816 | 700/276 |
| 2015/0228419 A1* | 8/2015 | Fadell | G08B 17/00 | 307/112 |
| 2015/0276239 A1* | 10/2015 | Fadell | G05D 23/1905 | 237/2 A |
| 2015/0276266 A1* | 10/2015 | Warren | H04W 4/70 | 700/300 |
| 2015/0310188 A1* | 10/2015 | Ford | G06F 21/10 | 726/28 |
| 2016/0099934 A1* | 4/2016 | Logue | H04L 63/0442 | 713/157 |

* cited by examiner

CLOUD BASED PEER ASSISTED UPDATES IN A DEVICE MANAGEMENT ENVIRONMENT

CROSS-REFERENCE TO RELATED APPLICATIONS

N/A

BACKGROUND

A number of different device management platforms exist including, for example, Dell's Cloud Client Manager. These device management platforms can allow a number of different types of devices, including, for example, thin clients, zero clients, tablets, and smartphones, to be monitored and managed from a single location (i.e., from the cloud). To allow this monitoring and management, a device agent is installed on each device so that the management server can communicate with the device agent to implement a desired type of monitoring or management. Such devices will hereafter be referred to as "managed devices."

One important management technique performed by the management server is the imaging of managed devices (typically thin clients) or the deployment of packages (which may include applications or other content) to the managed devices (hereinafter generally referred to as "deploying an update" to managed devices). Typically, when an update is to be deployed to a group of managed devices, the management server will send a notification to the managed devices informing them to download and install the update. With a large number of managed devices, this can result in high network traffic and load on the management server. In many cases, this high network traffic and load can result in the download of the update failing on many managed devices thereby prolonging the deployment process.

With regards to imaging, the size of the image can oftentimes be quite large (e.g., between 4 and 16 GB). The large image size can place an enhanced load on the management server during the imaging process. For this reason, many device management platforms will place a limit on the number of managed devices that can concurrently download an image from the management server. This limit can further prolong the imaging process, especially in environments having thousands of managed devices. Even if no limit is placed on the number of managed devices that can concurrently download an update, the deployment process can take a substantial amount of time including multiple days in large environments.

BRIEF SUMMARY

The present invention extends to methods, systems, and computer program products for providing peer assisted updates in a device management environment that employs a cloud based management server. When it is desired to deploy an update to a group of managed devices, the cloud based management server can send an update command to a first set of managed devices in the group instructing these managed devices to download the update from an on-premise server. Once these managed devices have downloaded and installed the update, they will notify the management server. In response, the management server can instruct these managed devices to remain awake so that they may each function as a repository for deploying the update to other managed devices in the group. In other words, after receiving an update, the managed device can commence functioning as a master device in a peer assisted update deployment technique. The management server can then send update commands to the other managed devices instructing them to download the update from one of the managed devices that is now acting as a master device. This process can be repeated as necessary until all managed devices in the group have been updated.

Accordingly, the responsibility for deploying the update to the managed devices can be spread among the managed devices themselves. In some cases, when specifying a managed device as a master device or source of the update, the management server can ensure that no managed device is specified in too many update commands which in turn will ensure that the managed device will not become overloaded with requests to download the update. As a result, a managed device that is currently acting as a master device may continue to be used in its typical manner (e.g., as a user workstation) with minimal effect on its performance.

In one embodiment, the present invention is implemented as a method for performing peer assisted update deployment in a device management environment. A management server can send a first update command to a first managed device. The first update command can specify a source for obtaining an update to be deployed on the first managed device. The management server can then receive, from the first managed device, a notification that the first managed device has obtained the update. The management server can then send, to each of at least one other managed device, an additional update command that specifies the first managed device as a source for obtaining the update to be deployed on the at least one other managed device.

In another embodiment, the present invention is implemented as a device management platform that includes a management server and a device agent configured to be installed on a number of devices to allow the devices to be managed by the management server as managed devices. The management server is configured to select an initial subset of the managed devices to receive an update and to send an update command to each managed device in the initial subset instructing each managed device in the initial subset to obtain the update from a server. The management server is further configured to detect when each managed device in the initial subset has received the update and to send additional update commands to other managed devices. Each additional update command specifies a managed device in the initial subset as a source for obtaining the update.

In another embodiment, the present invention is implemented as computer storage media storing computer executable instructions which when executed by one or more processors implement a method for performing peer assisted update deployment. An indication of a group of managed devices that are to receive an update can be received. A subset of the group to receive the update can be selected. The subset can then be commanded to receive the update from a server. It can then be detected when the subset has received the update. Then, the subset can be commanded to function as master devices for purposes of distributing the update to other managed devices in the group. Each of at least some of the other managed devices can also be commanded to receive the update from one of the master devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, a managed device should be construed as any type of computing device that includes a device agent of a device management platform. Managed devices may typically be thin clients or mobile devices. However, a desktop or laptop computer may also be a managed device.

Figure 1:
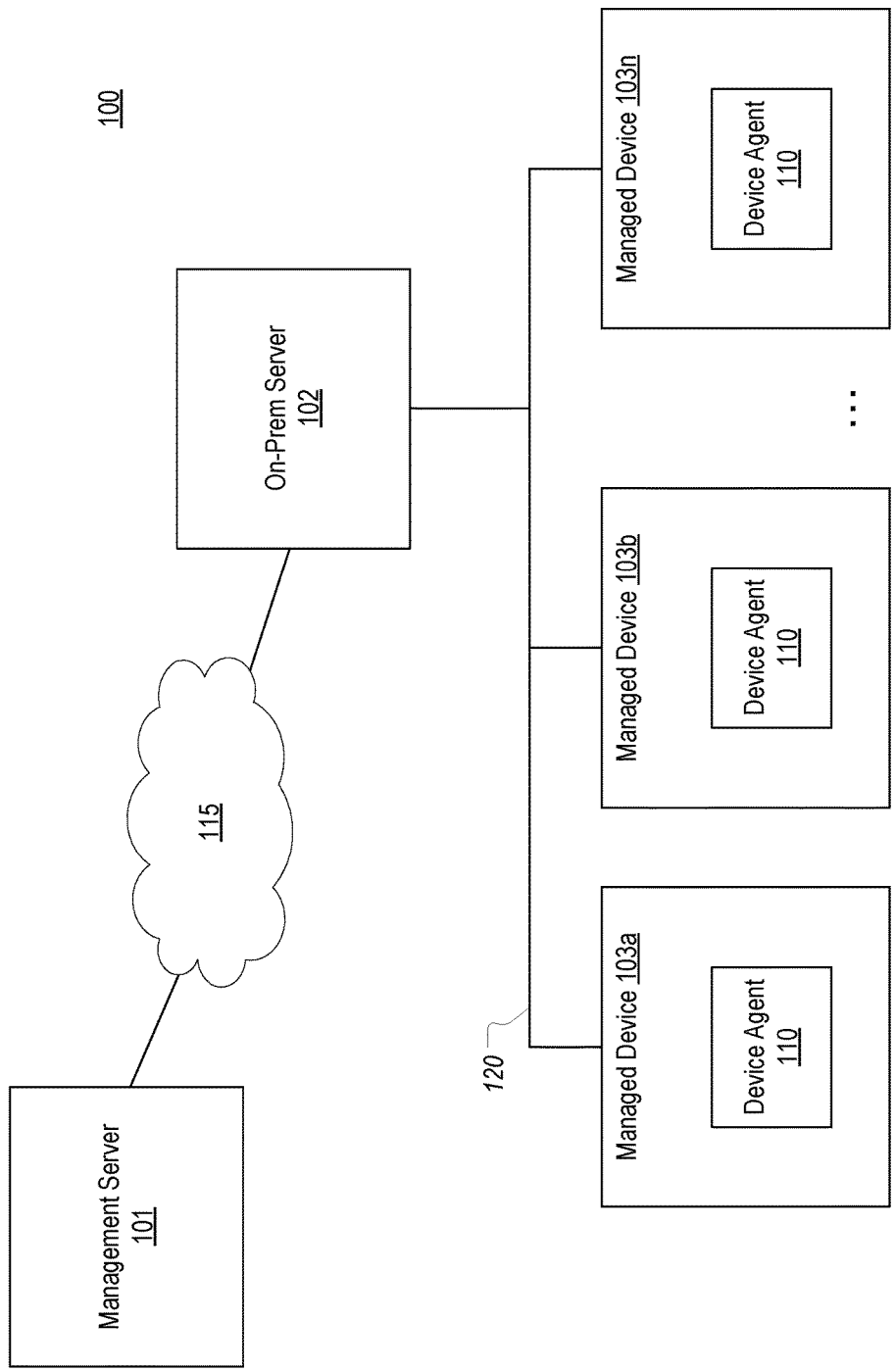
FIG. 1 illustrates an example computing environment in which the present invention can be implemented.

FIG. 1 illustrates an example computing environment 100 in which the present invention can be implemented. Computing environment 100 includes a management server 101, an on-premise server 102, and a number of managed devices 103a-103n (where n represents any number). As its name implies, on-premise server 102 will typically be located in the same geographic location as managed devices 103a-103n. More specifically, on-premise server 102 can be a server that is in the same local area network 120 as managed devices 103a-103n (i.e., on-premise server 102 and managed devices 103a-103n can be connected to the same intranet). For example, on-premise server 102 and managed devices 103a-103n can all be part of the same subnet. In contrast, management server 101 can be hosted in a public cloud and therefore function as Software as a Service. Therefore, on-premise server 102, as well as managed devices 103a-103n, can communicate with management server 101 via the internet 115.

Each of managed devices 103a-103n can include a device agent 110. Device agent 110 can comprise software that is configured to receive communications from management server 101 pertaining to management of the devices. Accordingly, to cause a device to become a managed device, device agent 110 can be installed on the device and registered with management server 101. In many implementations, an entity may group managed devices to allow for group management of the devices. For example, a company may define an accounting group that encompasses all managed devices employed by members of the company's accounting department. An administrator could then employ management server 101 to manage each of these managed devices in the group in accordance with group policies (e.g., deploying a common set of accounting applications/updates to each managed device). A group could include any number of managed devices including all of an entity's managed devices.

As introduced in the background, it is oftentimes desirable to update managed devices. In accordance with embodiments of the present invention, a peer assisted update deployment technique can be employed to allow an update to be distributed to each managed device in an efficient manner Initially, an administrator can employ functionality of management server 101 to identify an update to be deployed and each managed device to be updated. For example, the administrator could identify an image that is to be distributed to all thin client managed devices in the organization. Similarly, the administrator could identify a package containing a number of applications that should be deployed to all managed devices within a defined accounting group.

Figure 2A:
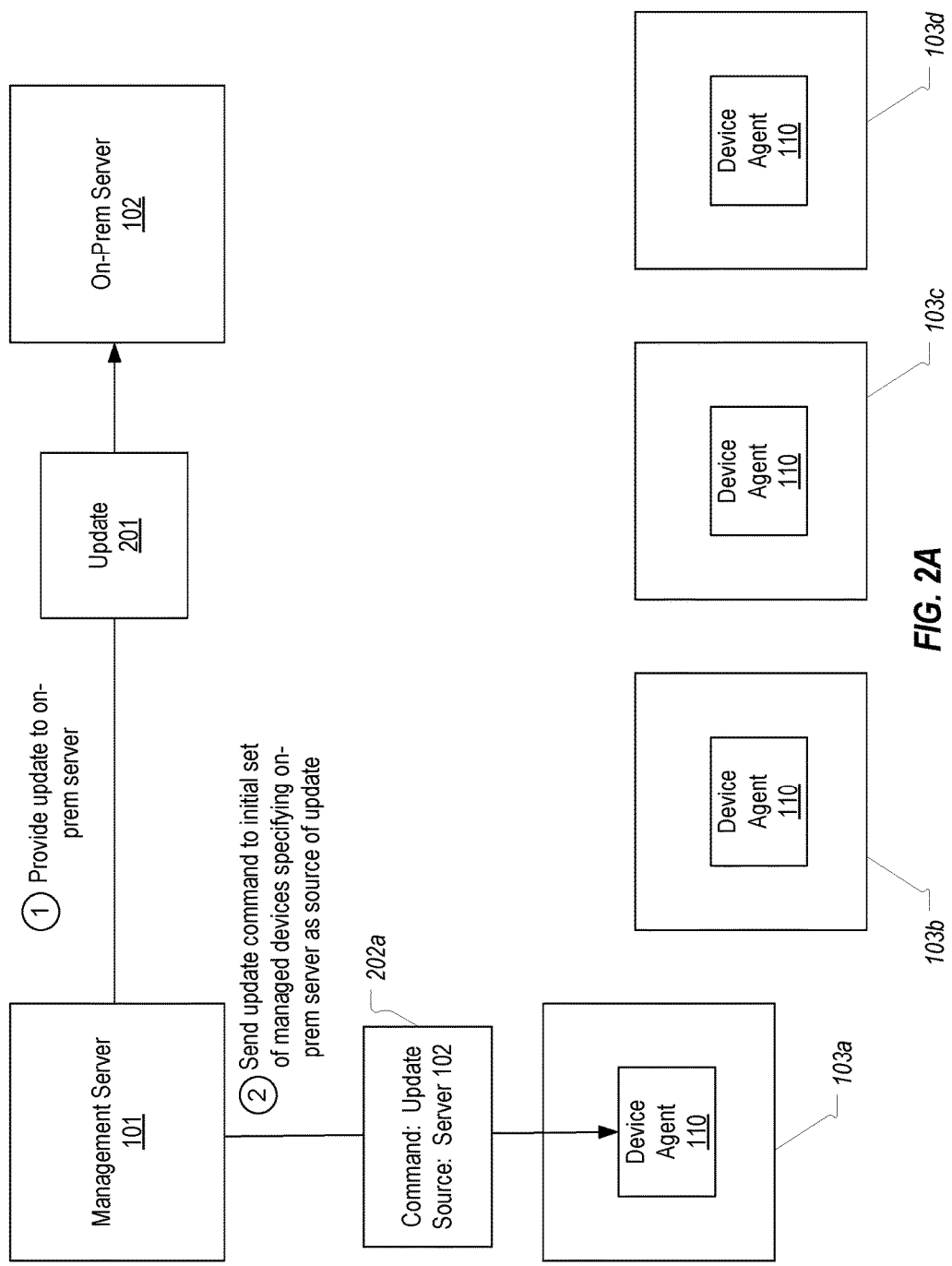
FIGS. 2A-2E illustrate an example of how peer assisted deployment of updates can be implemented in a managed device environment.

FIG. 2A-2E generally illustrate how the peer assisted update deployment technique of the present invention can be implemented. It is again noted that this technique for deploying updates encompasses any type of update including images or packages. FIG. 2A illustrates that management server 101 can initially provide an update 201 to on-premise server 102. The depiction of step 1 assumes that update 201 does not already exist on on-premise server 102. However, in many situations, the administrator may have already stored update 201 on on-premise server 102 prior to initiating the update process with management sever 101. In such cases, the administrator may only notify management server 101 of the identity and location of update 201 on on-premise server 102. In any case, after step 1, it will be assumed that management server 101 is aware of which update 201 is to be deployed and to which managed devices this update is to be provided. As part of the initial configuration of the update process, the administrator may also specify an update window (e.g., 2 days) during which the update should remain available for distribution to managed devices (and during which each managed device should be updated).

With this information, management server 101 can commence the update process by selecting an initial set of one or more managed devices to receive the update. It is emphasized that this initial set of managed devices will typically be a small percentage of the total number of managed devices to be updated. Then, in step 2, management server 101 can send an update command 202a to each managed device in the initial set (or more specifically, to the device agent 110 on each managed device in the initial set). Management server 101 could commence sending these update commands at the beginning of any specified update window.

As shown in FIG. 2A, this update command 202a can specify on-premise server 102 as the source from which the managed device should download update 201. Although FIG. 2A depicts that only managed device 103a is part of the initial set, it can be assumed that other managed devices would have also been selected to be part of the initial set and would therefore receive a similar update command For example, in an environment that includes thousands of managed devices to be updated, the initial set could include five to ten managed devices.

Figure 2B:
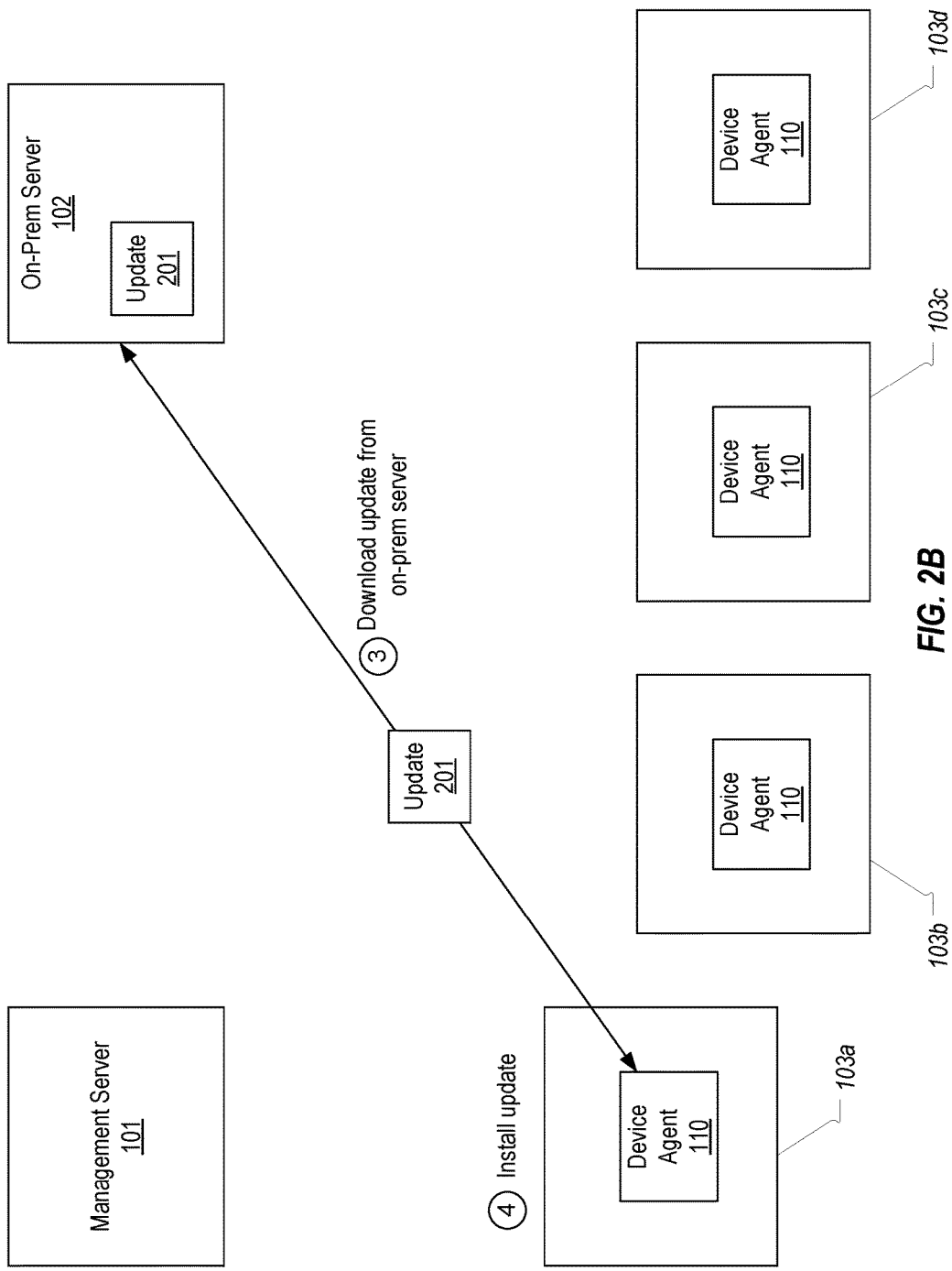

As shown in FIG. 2B, in response to update command 202a and in step 3, device agent 110 on managed device 103a can download update 201 from on-premise server 102. Then, in step 4, update 201 can be installed on managed device 103a. For example, if the update is an image, device agent 110 can cause managed device 103a to commence the imaging process, whereas, if the update 201 is a package, device agent 110 can commence an installation process. Although not shown, any other managed device in the initial set could also perform steps 3 and 4 to download and install update 201.

Figure 2C:
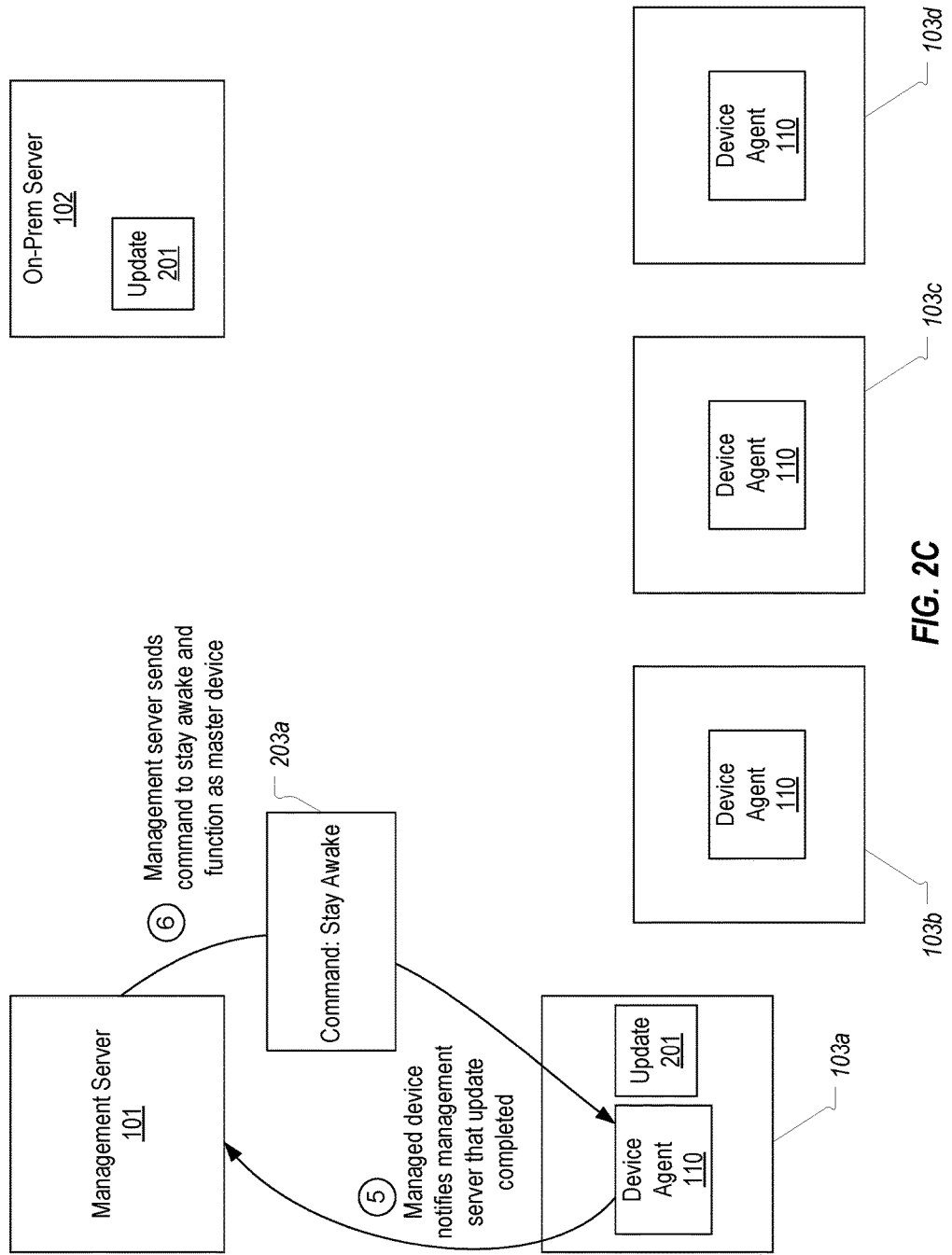

As shown in FIG. 2C, once update 201 has been installed on managed device 103a, in step 5, device agent 110 can notify management server 101 of the completion of the update process on managed device 103a. In response and because there are additional managed devices to be updated, management server 101 can select managed device 103*a* to be a master device for distribution of update 201 to other managed devices. As shown in step 6, the selection of managed device 103*a* as a master device can entail sending a stay awake command 203*a* to device agent 110. In response to stay awake command 203*a,* device agent 110 can prevent managed device 103*a* from sleeping to thereby allow device agent 110 to listen for requests from other managed devices to download update 201. Device agent 110 can also ensure that update 201 remains available for download from managed device 103*a* (e.g., by preventing any user and/or process from deleting or otherwise modifying update 201).

Figure 2D:
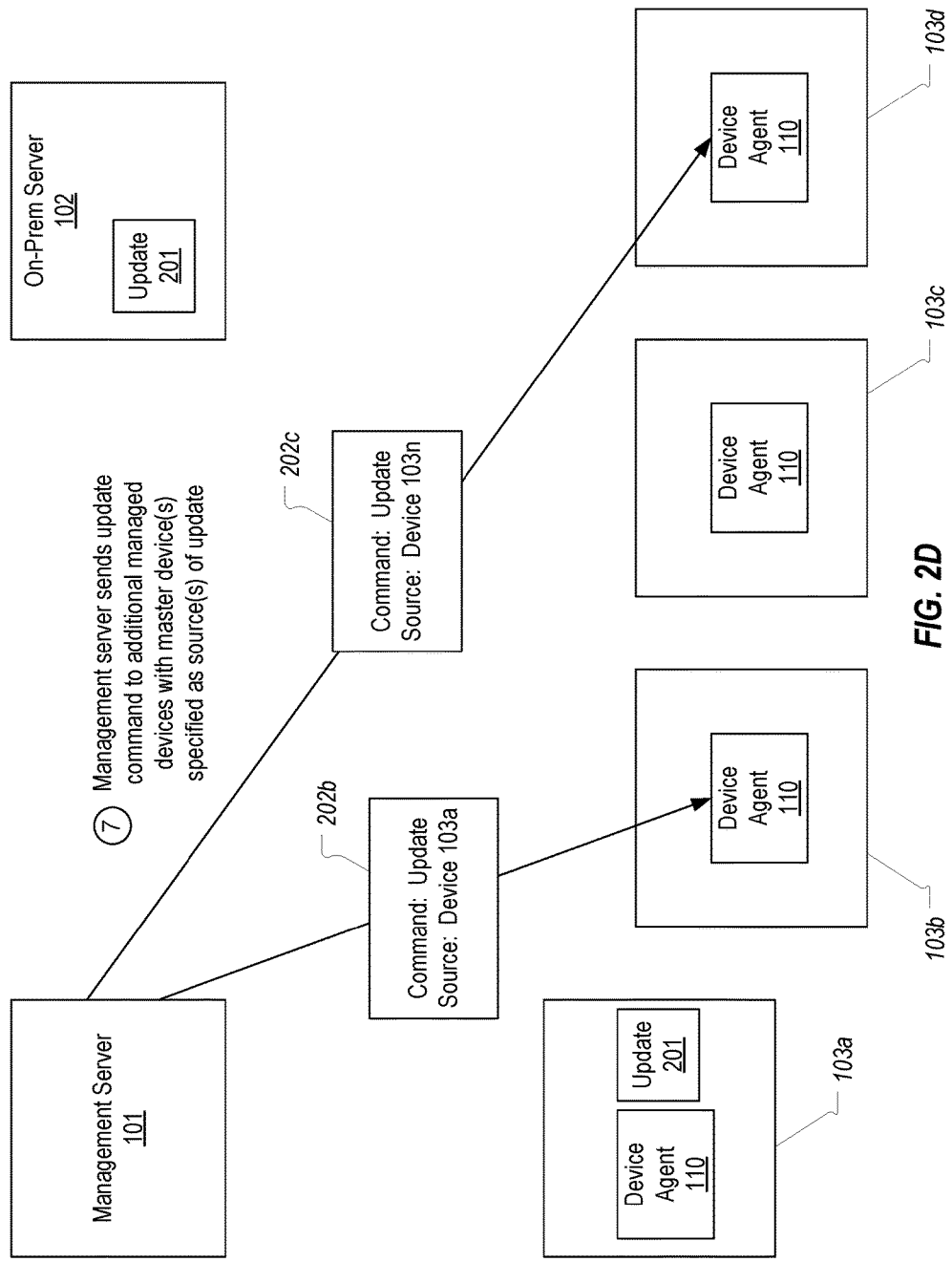

With managed device 103*a* now acting as a master device (or source of update 201), management server 101 can send out update commands to other managed devices that specify managed device 103*a* as the source of update 201. For example, as shown in FIG. 2D as step 7, management server 101 can send update command 202*b* to device agent 110 on managed device 103*b* which specifies managed device 103*a* as the source of update 201. FIG. 2D also represents that management server 101 can send update command 202*c* to device agent 110 on managed device 103*d* which specifies managed device 103*n* as the source of update 201 (which assumes that managed device 103*n* was included in the initial set). Accordingly, in response to update commands 202*b* and 202*c,* managed devices 103*b* and 103*d* will download update 201 from managed devices 103*a* and 103*n* respectively rather than from on-premise server 102. It is noted, however, that management server 101 could also send update commands to some managed devices that specifies on-premise server 102 as the source for update 201 such that on-premise server 102 will continue to act as a source of update 201 for some managed devices.

The result of this process is that an increasing number of managed devices can function as a source of update 201. In this way, the load can be shifted away from a single source (e.g., away from on-premise server 102) and distributed among the managed devices themselves. A key benefit of this process is that a large number of managed devices can be updated efficiently without placing a large load on any particular device. This process can also allow an entity to efficiently update a large number of managed devices without needing to invest in multiple on-premises servers to serve as sources of the update.

In some embodiments, management server 101 can be configured to further optimize the update process. For example, management server 101 can track which managed devices are acting as master devices as well as which managed devices have been commanded to download the update from each master device. By tracking this information, management server 101 can ensure that the load caused by downloading the update can be spread among the master devices (as well as possibly on-premise server 102). For example, if it is assumed that only five managed devices will be allowed to concurrently download an update from a master device, management server 101 can track the number of outstanding update commands which specify a particular master device and only send out new update commands specifying that particular master device as the number of outstanding update commands falls below five.

Also, in some embodiments, management server 101 can specify a total number of downloads that each master device will be allowed to provide. For example, if this total number of downloads is twenty, management server 101 can track the total number of update commands it sends out that specify managed device 103*a* as the source for update 201. Then, once this total number reaches twenty, management server 101 can cease specifying managed device 103*a* as the source and notify managed device 103*a* that it no longer needs to function as a master device. This can ensure that a managed device will not function as a master device for too long of a period which can minimize any performance impact the update process may have on managed devices that are selected to serve as master devices.

As can be seen, this peer assisted update process can allow an update to be quickly deployed to all managed devices with minimal impact on a single source (whether the source is on-premise server 102 or any managed device that is selected as a master device). For example, if all managed devices that have completed the update process become master devices, the number of master devices can grow exponentially thereby allowing management server 101 to send update commands to all managed devices in a relatively short period of time. However, in some embodiments, management server 101 may limit the number of concurrent master devices and/or outstanding update commands so as to not overburden the network. For example, management server 101 may maintain a maximum number of master devices and/or a maximum number of outstanding update commands to place a ceiling on the amount of network traffic that will be devoted to the downloading of the update.

Figure 2E:
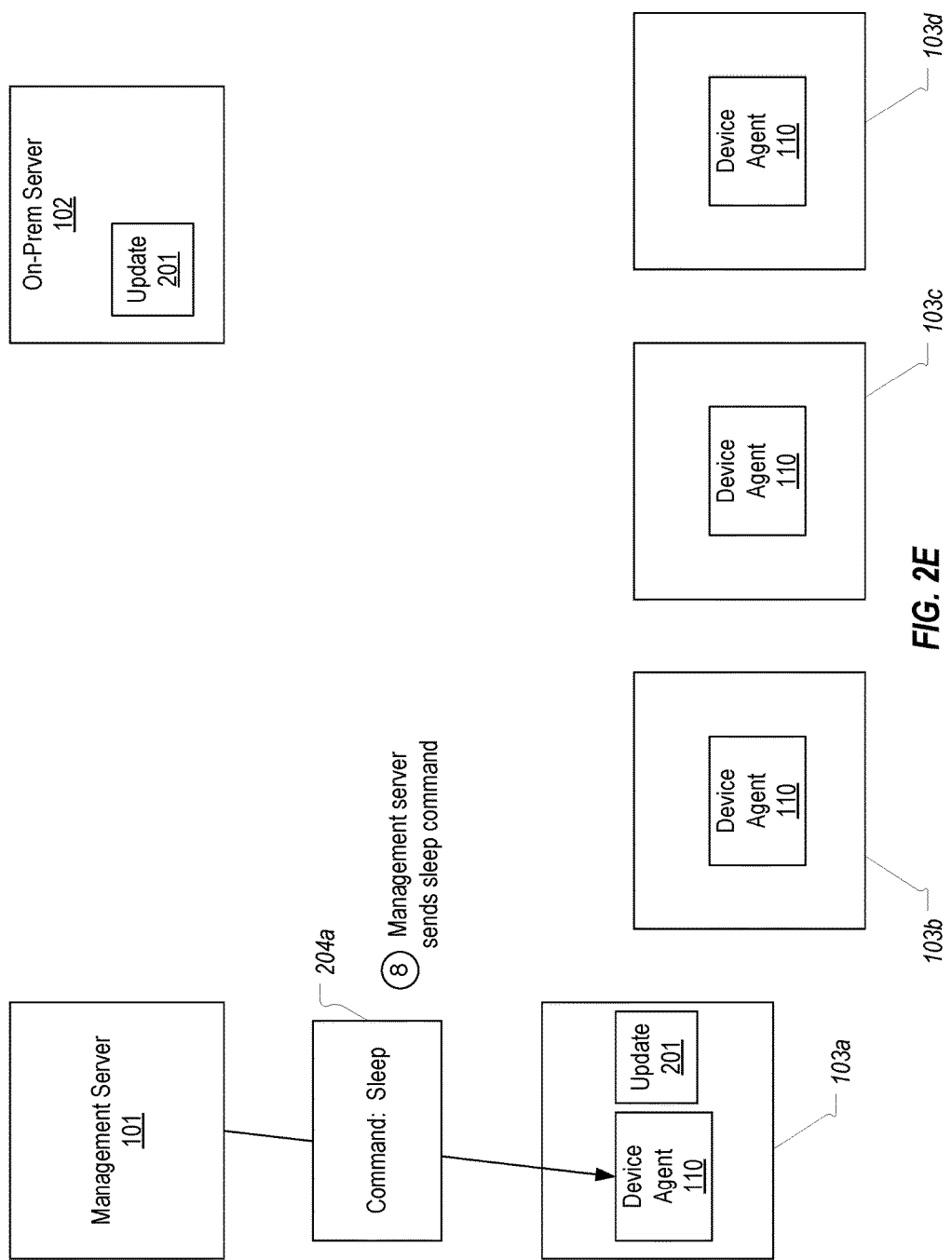

Once each managed device has been updated (or the update window has expired), management server 101 can send a sleep command to the device agent 110 on any managed device that is acting as a master device. For example, FIG. 2E shows that, in step 8, management server 101 can send sleep command 204*a* to device agent 110 on managed device 103*a*. This sleep command can inform the device agent that the managed device will no longer need to act as a master device, and therefore, the device agent can allow the managed device to resume normal operation including allowing the managed device to go to sleep if inactive. A similar sleep command could also be sent to a managed device that is acting as a master device if management server 101 decides that the managed device should no longer act as a master device. For example, if the update process defines a total number of downloads that a master device should be able to provide, or similarly a total amount of time that a managed device should be able to act as a master device, management server 101 could send a sleep command when either of these thresholds is reached even if the update window has not lapsed and less than all managed devices have been updated.

Although FIGS. 2A-2E depict the update process as employing an on-premise server, in some embodiments of the invention, the update process can be implemented without an on-premise server. For example, the initial set of managed devices may receive an update command identifying management server 101 (or another off-premise server) as the source of the update. After this initial set of managed devices install the update, these managed devices may then commence functioning as master devices for distributing the update to other managed devices in the same manner as described above. Although downloading a large update from management server 101 (i.e., over the internal may require a large amount of time, since only the initial set of managed devices would need to do so, the downloading/updating performed by the remaining managed devices can still be efficiently performed using the peer assisted update deployment technique.

In some embodiments, it may not be necessary for a managed device to complete the update process before commencing operation as a master device. For example, after downloading update 201 but before installing it, managed device 103a may commence acting as a master device for purposes of distributing update 201 to other managed devices. However, in many situations, it is preferable to require a managed device to complete the update process prior to acting as a master device since the managed device may be inaccessible during the update process or may require one or more restarts as part of the update process. Such inaccessibility could result in failed downloads as other managed devices commence the update process.

Figure 3:
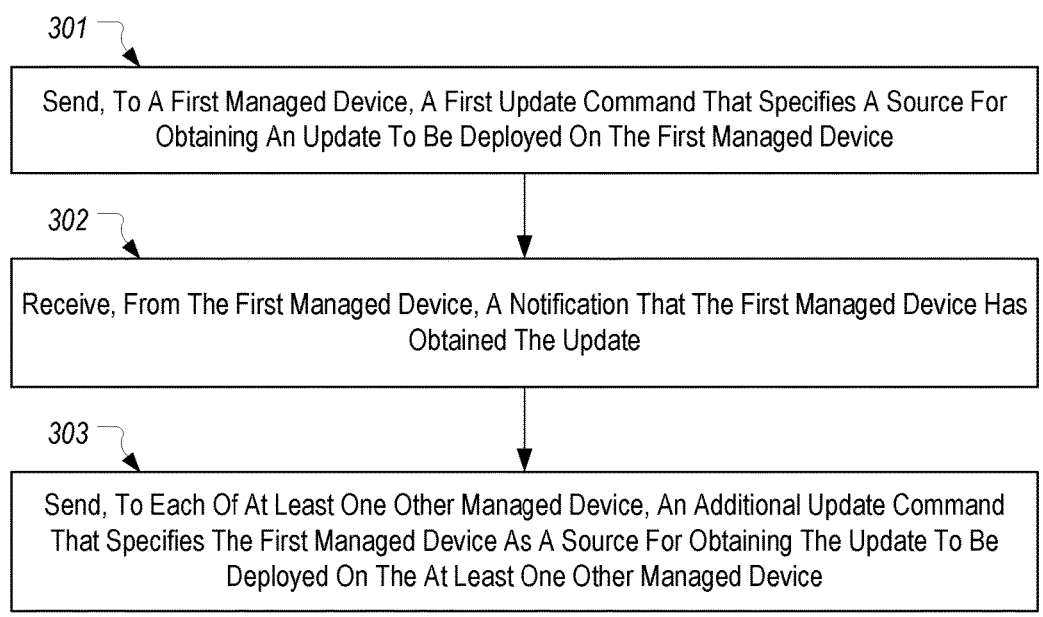
FIG. 3 illustrates a flowchart of an example method for performing peer assisted update deployment in a device management environment.

FIG. 3 provides a flowchart of an example method 300 for performing peer assisted update deployment. Method 300 can be performed by management server 101 and will be described with reference to FIGS. 2A-2E.

Method 300 includes an act 301 of sending, to a first managed device, a first update command that specifies a source for obtaining an update to be deployed on the first managed device. For example, management server 101 can send update command 202a to managed device 103a where update command 202a specifies on-premise server 102 as the source for obtaining update 201.

Method 300 can include an act 302 of receiving, from the first managed device, a notification that the first managed device has obtained the update. For example, management server 101 can receive a notification from managed device 103a that it has received and installed update 201.

Method 300 can include an act 303 of sending, to each of at least one other managed device, an additional update command that specifies the first managed device as a source for obtaining the update to be deployed on the at least one other managed device. For example, management server 101 can send update command 202b to managed device 103b where update command 202b specifies managed device 103a as the source for obtaining update 201.

To summarize, the present invention allows updates to be distributed more efficiently to managed devices. For example, in an environment that may have 100,000 managed devices and a single on-premise server connected to the same subnet, if every managed device were required to download an update from the on-premise server, it could take an inordinate amount of time and network bandwidth to do so. However, with the techniques of the present invention, the distribution of the update to the 100,000 managed devices can be performed more efficiently without placing excessive load on the on-premise server. One primary benefit of this approach is that there would be no need to invest in additional on-premise servers to handle greater numbers of managed devices.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method implemented by a cloud based management server in a device management environment for performing peer assisted update deployment, the method comprising:
   sending, to a first managed device of a group of managed devices, a first update command that specifies a source for obtaining an update that is to be deployed on each managed device in the group to cause each managed device in the group to be updated;
   receiving, from the first managed device, a notification that the first managed device has obtained the update; and
   sending, to each of at least one other managed device in the group, an additional update command that specifies the first managed device as a source for obtaining the update such that the update that is to be deployed on each managed device in the group is sent to the first managed device to enable the first managed device to be updated and then the first managed device functions as the source for the at least one other managed device in the group to obtain the update.

2. The method of claim 1, wherein each managed device in the group is a thin client.

3. The method of claim 1, wherein the first update command specifies an on-premise server as the source for obtaining the update.

4. The method of claim 1, wherein the update comprises one of an image or a package.

5. The method of claim 1, wherein the notification that the first managed device has obtained the update also comprises a notification that the update has been installed on the first managed device.

6. The method of claim 1, further comprising:
in response to the notification and in conjunction with sending each additional update command, sending a command to the first managed device to remain awake to allow the first managed device to function as a master device for distributing the update to the at least one other managed device in the group.

7. The method of claim 6, further comprising:
receiving, from each of the at least one other managed device in the group, a notification that the other managed device has obtained the update; and
in response, sending a command to the first managed device instructing the first managed device to cease functioning as a master device.

8. The method of claim 7, wherein ceasing functioning as a master device comprises allowing the first managed device to sleep when inactive.

9. The method of claim 1, wherein the at least one other managed device in the group comprises a specified number of managed devices, the specified number conforming to a maximum number of concurrent update commands that can specify the first managed device as the source for obtaining the update.

10. The method of claim 9, further comprising:
receiving, from each of one or more of the at least one other managed device in the group, a notification that the other managed device has obtained the update; and
sending, to each of one or more additional managed devices in the group, an additional update command that specifies the first managed device as a source for obtaining the update.

11. The method of claim 1, wherein the at least one other managed device in the group, includes a second managed device, the method further comprising:
receiving, from the second managed device, a notification that the second managed device has obtained the update; and
sending, to each of at least one additional managed device in the group, an additional update command that specifies the second managed device as a source for obtaining the update.

12. The method of claim 1, wherein the number of managed devices that the management server specifies as a source for obtaining the update is limited in accordance with a policy for managing load.

13. The method of claim 1, wherein the number of update commands that the management server sends is limited in accordance with a policy for managing load.

14. A device management platform comprising:
a cloud based management server; and
a device agent configured to be installed on a number of devices to allow the devices to be managed by the management server as a group of managed devices;
wherein the management server is configured to select an initial subset of the group of managed devices to receive an update that is to be deployed on each managed device in the group to cause each managed device in the group to be updated and to send an update command to each managed device in the initial subset instructing each managed device in the initial subset to obtain the update from a server; and
wherein the management server is further configured to detect when each managed device in the initial subset has received the update and to send additional update commands to other managed devices in the group, each additional update command specifying a managed device in the initial subset as a source for obtaining the update.

15. The device management platform of claim 14, wherein the server is an on-premise server.

16. The device management platform of claim 14, wherein the management server, in conjunction with sending the additional update commands, is further configured to send a command to each managed device in the initial subset instructing each managed device in the initial subset to function as a master device for purposes of distributing the update to one or more of the other managed devices in the group.

17. The device management platform of claim 14, wherein detecting when each managed device in the initial subset has received the update comprises receiving a notification from each managed device in the initial subset that the update was installed on the managed device.

18. The device management platform of claim 14, wherein the management server is further configured to detect when each of the other managed devices in the group has received the update, and in response, send a command to each managed device in the initial subset instructing each managed device in the initial subset to cease functioning as a source for obtaining the update.

19. One or more computer storage media storing computer executable instructions which when executed by one or more processors implement a method for performing peer assisted update deployment, the method comprising:
receiving, at a cloud based management server, an indication of a group of managed devices that are to receive an update that is to be deployed on each managed device in the group to cause each managed device in the group to be updated;
selecting a subset of the group to receive the update;
commanding the subset to receive the update from a local server;
detecting when the subset has received the update;
commanding the subset to function as master devices for purposes of distributing the update to other managed devices in the group; and
commanding each of at least some of the other managed devices in the group to receive the update from one of the master devices such that the update that is to be deployed on each managed device in the group is sent to the subset to enable the subset to be updated and then the subset function as master devices for purposes of distributing the update to other managed devices in the group.

20. The computer storage media of claim 19, wherein the method further comprises:
commanding at least one managed device in the subset to cease functioning as a master device in response to determining that all managed devices in the group have received the update or that an update window has lapsed.

* * * * *